United States Patent Office 3,475,086
Patented Oct. 28, 1969

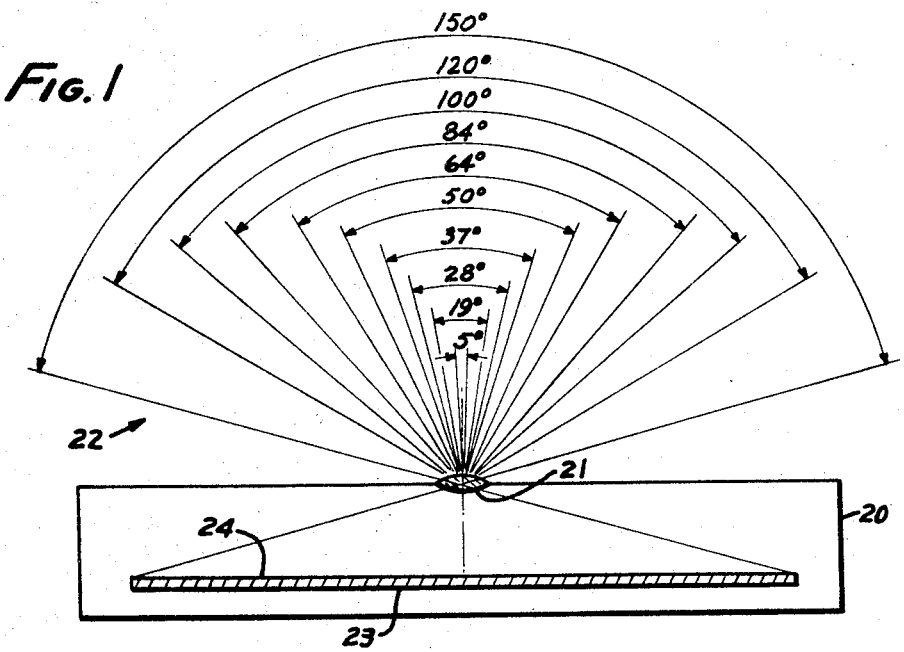
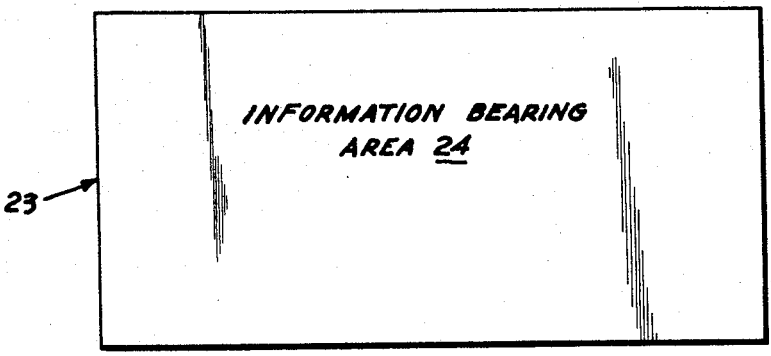
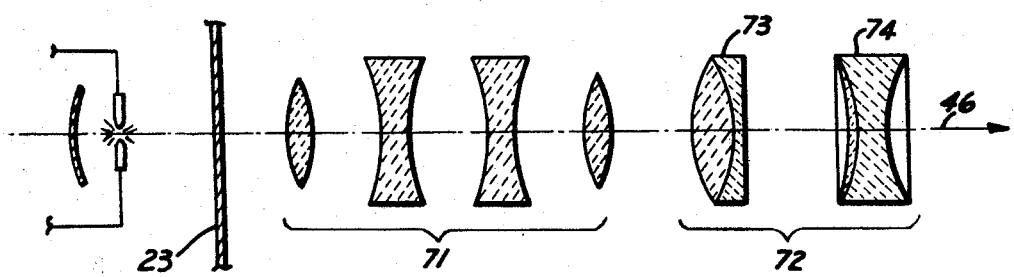

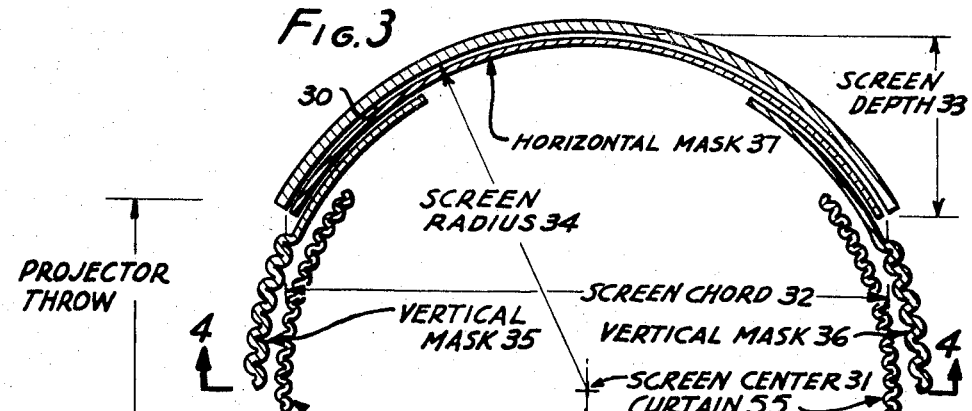
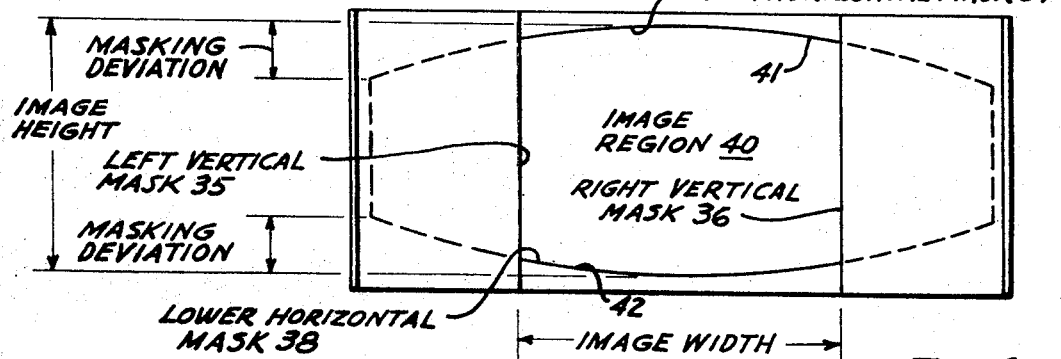
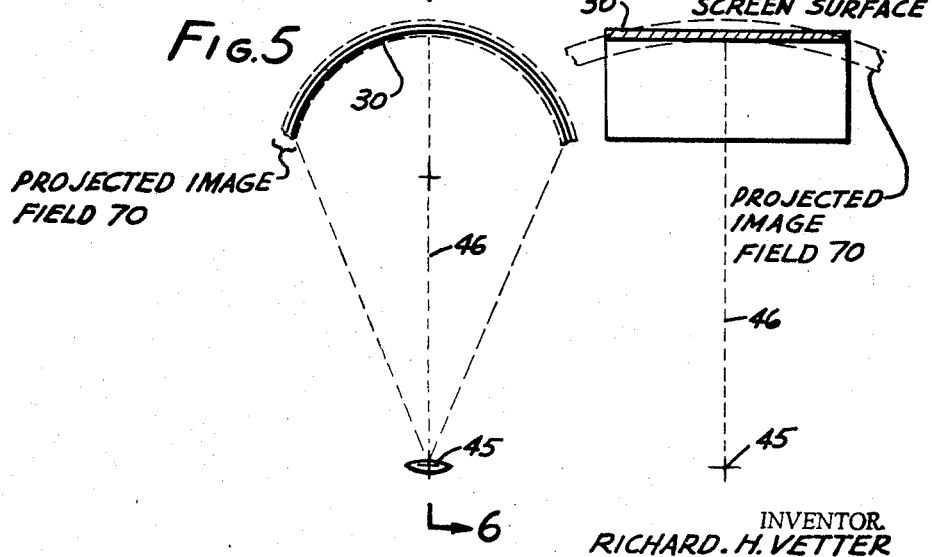

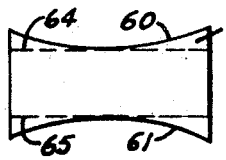 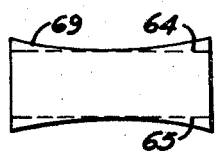 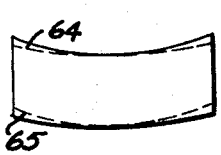 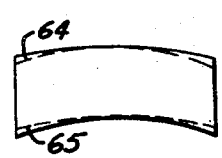
FIG.9A   FIG.10A   FIG.11A   FIG.12A
 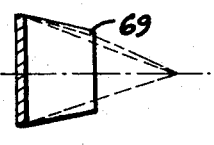 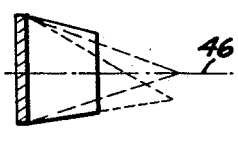 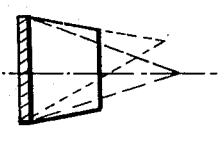
FIG.9B   FIG.10B   FIG.11B   FIG.12B
   
FIG.9C   FIG.10C   FIG.11C   FIG.12C
 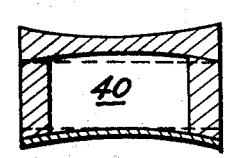 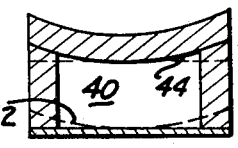 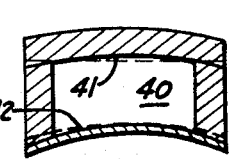
FIG.9D   FIG.10D   FIG.11D   FIG.12D
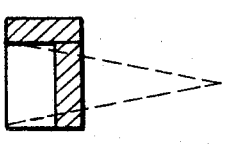 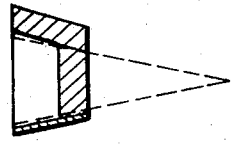 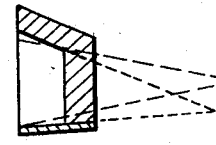 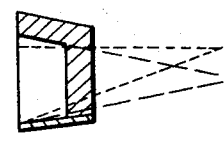
FIG.9E   FIG.10E   FIG.11E   FIG.12E
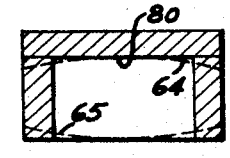 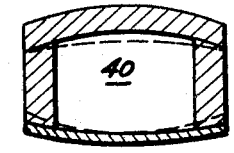 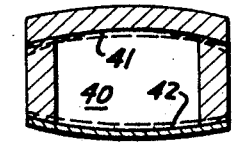 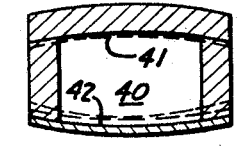
FIG.9F   FIG.10F   FIG.11F   FIG.12F
INVENTOR.
RICHARD H. VETTER
BY
ATTORNEYS.

3,475,086
CINEMA SYSTEM UTILIZING A DEEPLY CURVED SCREEN AND A MASK FOR PROVIDING AN ILLUSION
Richard H. Vetter, Pacific Palisades, Calif., assignor to D–150, Inc., Los Angeles, Calif., a corporation of California
Filed Feb. 10, 1966, Ser. No. 526,581
Int. Cl. G03b 37/02
U.S. Cl. 352—69       13 Claims

ABSTRACT OF THE DISCLOSURE

This invention relates to a cinema process that utilizes a deeply curved screen to provide an illusion of participation and involvement which is at least in part derived from the shape of a mask (which may have a variable aspect ratio), and from a lens system which enables the focus of the picture to be quite sharp, for film instability effects to be minimized, and for the curvature and size of the image substantially to coincide with those of the screen. As to the latter two features, a magnifying lens system is provided on the opposite side of the prime lens from the film plane comprising a positive and a negative doublet in that order, the axial location of the negative doublet relative to the prime lens and positive doublet being adjustable.

---

This invention concerns a motion picture process related to the presentation on a deeply curved screen of an image which presents to an audience that is distributed over a substantial area, the illusion of a well-ordered field of view without unreal distortions, even though the members of the audience occupy positions that have different angles of viewing elevation, and different angles of lateral incidence relative to the screen.

This invention also relates to a method of securing such a motion picture and presenting the same, together with various photographic, projection, and masking devices and systems.

It is customary to project motion pictures through a lens which produces a diverging beam. This beam impinges upon a screen sheet with an image region that is seen by members of an audience. These members occupy different positions relative to the screen both as to elevational angle and lateral angle relative to the projector axis. Such problems as pin-cushioning, barreling and various distortions arise in any motion picture process, but with flat screens, the art has been rather well worked out. The solution is, of course, greatly simplified by the fact that a straight line projected onto a flat screen will be seen as a straight line by any member of the audience. Also, even complex curves will maintain enough of their most important identifying characteristics, no matter what the angle or distance, and images projected onto flat screens will therefore appear realistic to the members of the audience.

However, when a deeply curved screen is used, the problems are not so easily solved and, in fact, have heretofore evaded solution in the art, even after many expensive attempts. Deeply curved screens are now becoming of increasing importance in the motion picture field and involve such relatively large dimensions as 70-foot chords, 85-foot lengths of arc, 35-foot picture heights, and screen radii of 40½ feet. When a straight line (other than a vertical one) is projected onto this class of screen, the only location which really "sees" the line as straight is the projector itself, and, of course, no member of the audience sits there. Instead, the audience sits in various locations relative to which this line is viewed as a curve, and therefore has a distorted appearance. Elements which are inherently curved are even more distorted, and often to the extent that the image is not realistic to observers in many locations in the audience area. Almost as important as this objection is the relative lack of quality which has heretofore been attained—poor resolution, astigmatisms, and the like.

Clearly, in commercial motion picture presentation, it is necessary to provide an image which will be at least believable as to the viewer as he sees it, for example in which rivers seem to flow down instead of up, and in which horizons seem to be flat. Furthermore, the image should be sharp and clear. The image itself might not, in fact, be a true image as it would be on a flat screen, but instead it might be something else. However, as to the viewer, it should constitute a well-ordered field in which everything is believable, in which disordered objects such as rivers flowing upward will be rejected, and in which the objects are clearly and cleanly visible, all of this over an audience area of commercially practical size.

Lens systems and the like have been proposed to rectify the images on the film so as to produce a more believable image on the screen. An example of one such system is to be found in applicant's co-pending patent application, Ser. No. 314,745, filed Oct. 8, 1963, entitled "Cinematographic Process" (now abandoned) and such systems have been successful even though they have some technical disadvantages. It has now been learned that an image can be provided to a viewer which is regarded by the viewer as a well-ordered field of vision by combining certain sub-system aspects of photographic systems, projection systems and masking devices for the screen itself, without necessarily modifying the image on the film itself, although this can still be done, if desired. These sub-systems have their own individual merits, which also are the subject of this invention. When they are combined into one total system, the result is a greatly improved illusion to the viewer, and a process which achieves perfection as to the viewer of an order which has not been approached up to the present time.

Further, it has been found that certain of these sub-systems, such as the masking, enable a theatre to be designed for multiple purposes, and thereby to have the capacity to show with effective illusion and with a deeply curved screen, a wide range of image sizes and aspect ratios. A simple masking system and simple circuitry can now be provided in a single theatre which adapts the theatre to present such diverse formats as 16 and 35 mm. spherical, 35 mm. spherical wide screen and anamorphic, and 70 mm. spherical and D–150.

This invention will be fully understood from the following detailed description and the accompanying drawings in which:

FIG. 1 is a schematic plan view of a photographic system used in the invention;
FIG. 2 is a side view of a portion of FIG. 1;
FIG. 3 is a plan view of a portion of a projection system used in the invention;
FIG. 4 is a view of FIG. 3 taken at line 4—4 therein;
FIG. 5 is a plan view showing additional details of the said projection system;
FIG. 6 is a view of FIG. 5 taken at line 6—6 therein;
FIG. 7 is an axial cross-section of a portion of FIG. 5;
FIG. 8 is an axial section of a theatre utilizing the invention; and
FIGS. 9A–9F through 12A–12F are schematic representations of screen systems to illustrate the invention.

The photographic portion of this system is best shown in FIGS. 1 and 2 wherein a camera lens 20 is mounted in a camera 21 so as to focus a field of view 22 upon a film 23. The film includes an information bearing area 24. The film, camera, film transport, lens mount and the like, may be those which are commonly used and well known in the art.

A desirable photographic system to produce films which are particularly well-suited for projection on deeply curved screen as used in this invention involves the inclusion in the photographic process of lenses having a wide range of respective focal lengths and fields of angular subtense. For example, the following group of lenses has been shown to give good coverage for respective types of scenes, extending all the way from very fine closeups to large panoramic views:

| Focal Length, mm. | Angular Field (Subtense) degrees | Focal Length, mm. | Angular Field (Subtense) degrees |
| --- | --- | --- | --- |
| 500 | 5 | 40 | 64 |
| 150 | 19 | 30 | 84 |
| 105 | 28 | 24 | 100 |
| 78 | 37 | 15 | 120 |
| 55 | 50 | 8 | 150 |

The purpose of the above variety of lenses (not all of which would necessarily be used in any given production) is to enable a plurality of scenes to be recorded on film, utilizing for respective ones of said scenes lenses of different angular subtense to produce different unit densities of information on film frames of a constant area. Thus, on a film frame taken with a 150° angular subtense, there will be a greater density of information per unit area of film than there will be on a film frame derived from photography utilizing a lens with a 5° angle. This enables information for the same size of screen to be secured from different lenses and different fields of view so as to give the member of the audience a feeling of close participation in the subject matter being photographed. Regardless of the photographic lens which is used, the aspect ratio or screen size is rarely changed from scene to scene, or sequence to sequence, in projection, although it could be. This invention enables that result to be attained. The purpose of selectively varying the angular subtense of the lenses (which is a function of their focal length) is to provide different densities of information and a "feel" of participation.

The projection portion of the system, which may be utilized both in combination with the camera system of FIGS. 1 and 2 and also with films derived from standard camera systems, is shown in FIGS. 3 and 4. However, when film produced by the camera system of FIGS. 1 and 2 is utilized, an even greater illusion of a well-ordered field is secured. The projection portion of the system is shown in its preferred embodiment in FIGS. 3 and 4, and includes an arcuate screen 30. Preferably, the radius of the arc is constant and the projection surface is cylindrical. However, this is not a limitation on the invention, deviations from circularity being permissible. The term "deeply curved" as applied to screens herein means screens whose radius, or mean radius, is about sixty percent (60%) or less of the projection radius. The term "projection radius" means the distance from the projector to the screen along the projection axis. The screen includes a center (or a mean center where the arc is other than circular) 31, a screen chord 32, a screen depth 33 measured from the screen chord to the center of the screen, and a screen radius 34.

The screen sheet includes an image region 40, which is as a matter of convenience a continuation of a larger sheet of material. The screen sheet (and the image region) is a "bent plane," that is, it is a generated surface whose generator is a straight line which, in FIG. 4, is parallel to the edge of mask 36, guided by a directrix whose curvature is shown in FIG. 5. The generator is generally upright, and the plane in which the curved directrix stands is generally normal to the generator, as shown in FIG. 5. There is a mid-elevation in the image region midway between its upper and lower boundaries.

The projection system also preferably includes a masking technique which is preferably adjustable so as to provide for projection of different aspect ratios and image sizes. In fact, the aspect ratio may be changed in only a few seconds. For this purpose, there is provided a first mask 35 and a second mask 36, these masks customarily being hung by trolleys from rails so as to be movable toward and away from the center of the screen along an arc as indicated in FIG. 3. An upper mask 37 and a lower mask 38 are also provided. In this invention, the choice of which of the upper and lower mask is to be used, or whether both should be used, will be determined by the parameters of the theatre in which the system is installed. For convenience in discussion and illustration the first and second masks 35 and 36 are sometimes respectively called the "left vertical mask" and the "right vertical mask," and the upper and lower masks 37 and 38 are sometimes respectively called the "upper horizontal mask" and the "lower horizontal mask." One or the other will be provided, and sometimes both will be. The masks stand between the projector and the screen, and are preferably opaque and dark in color. This selective masking has the advantage that it can be adjusted so that frame sizes and magnifications are compatible, and a good image is provided which does not overtax the data storage capacity of the print. Sometimes herein either the upper or lower mask edge is referred to as a "third edge." This is the curved generally horizontal edge, and there will always be one, whose contour is concave toward the mid-elevation of the image region, the elevation of the intersections with the side edges being closer to the elevation of the mid-elevation of the image region than is the elevation of the mid-point of the third edge. The fourth edge, when provided, may be of any desired shape, one of them being the inversion of the opposite edge.

As can best be seen in FIG. 4, the resultant masking technique provides an image region 40 which is bounded by the four masking surfaces (or an edge of the screen where no masking surface is used). The system shown is capable of providing any desired aspect ratio, but there are five in which projection processes presently used in the United States are included. These are:

(a) 1.33:1—standard spherical 16 mm. and 35 mm.
(b) 1.85:1—spherical 35 mm. wide screen
(c) 2.35:1—35 mm. anamorphic
(d) 2.25:1—70 mm. spherical
(e) 2.20:1—70 mm. D-150 spherical Evidently, different frame sizes (on the screen), and different aspect ratios for the image region, can be accommodated merely by shifting the masking edges. The masks are placed as close as practicable to the screen, and stand between the screen and the audience.

The terms "masking" and "mask" as used herein do not refer to the theatre curtain, nor to the customary draperies which frame a stage, either on the top, bottom, or sides. A set of such side curtains 55 is shown to illustrate these. Because they are a routine and expected part of theatre installations, viewers do not relate them to the scene. However, masks are not as common as, nor regarded the same as curtains, and have an entirely different effect from that of a closure. The masks never obscure the image region from view. Instead they frame it, which is not the function of the curtain. The curtain is shown only in FIG. 3. In FIG. 4, illustration thereof would obscure the elements intended to be emphasized therein.

An object of this invention is to provide means for projecting the above and any other aspect ratios and image sizes which can be accommodated on a given screen, so that there is the illusion to an audience of a well-ordered field of view without unreal distortions.

It is usually most convenient for the first and second masks to be hung on trolleys that are movable on rails which follow the front contour of the screen. The first and second (right and left) masks may then readily be moved by means of any desired curtain-shifting mechanism. Such mechanisms are well known in the theatre art. These masks are conveniently made of hanging fabric, which can be piled at the outer ends of the run. The free edge of the mask can be pulled, while the remainder follows, in changing the masking width. Of course, they may be made of rigid material adapted to slide in ways.

The upper mask is generally, but not necessarily, movable up and down. It preferably comprises a flexible fabric formed with a contoured edge 41 which hangs from a horizontal bar so as to keep its arcuate edge shape. The bar can be raised and lowered by pulley-cable combinations, thereby to raise and lower the masks as a unit, and vary the height of the image region. Ordinarily, the lower horizontal mask is not vertically movable, but is more conveniently left in place. It, too, has a contoured edge 42 and it may be movable up and down, if desired. It may also be made of flexible fabric, or from rigid material, as preferred. Any desired control circuitry may be included to move the masks. Conventional circuitry associated with push buttons and limit switches may serve to actuate motors to move the masks to their desired positions, there to be stopped through interruption of the motors by limit switches that are actuated when the mask has reached a pre-determined, or selected, location.

Because this process is intended for showing in commercial theatres, it must be suitable to persons seated in a wide range of locations. In FIG. 8, a projection lens 45 is shown with its axis 46 impinging normally onto the center of screen 30. The theatre illustrated has a lower floor 47 and a balcony 48. Viewers 49, 50, respectively, are shown in the mean poistions directly beneath and above the projection axis on each of these floors. They have respective axes of view 51, 52 relative to the horizontal. For convenience in discussion hereafter, the angle of incidence of axis 46 will be discussed as the projector's angle relative to the horizontal (a vertical screen being assumed) and angles $\theta$ and $\phi$ as relating to the elevation relative to the horizontal of axes 51 and 52 of the mean viewer (which in this case are a positive angle up and a negative angle down, respectively).

It is to be understood that many theatres may have only lower floors, and others may also have balconies, and that any of the axes may be directed either up or down. It will further be evident that these angles will be different for different viewers and would thereby change the geometric relations of the image relative to each viewer. It is one of the functional results of this invention that, no matter where the viewer sits within the intended area, a satisfactory, well-ordered field of view is provided to all of them, and this on a deeply curved screen which gives an effective illusion and the feeling of presence.

The projection portion of this system includes important strides over the prior art in projection lenses and techniques. Heretofore attempts have been made to project single frames on deeply curved screens, but in general they have been failures because the film is unstable and conventional lens systems have been very sensitive to film instability. For this class of projection, quite a short focal length is a necessity, and with such short focal lengths (such as lengths on the order of perhaps 1.9 to as much as 4"), the back focus is very critical and the entrance aperture is close to the film plane. Film instability, especially that of flutter in the film plane which is primarily caused by the heat of the light source, is greatly magnified as an annoyance to the viewer. This disadvantage is overcome in the instant invention by the use of a retrofocus attachment wherein the back focus is increased, and the system is therefore far less sensitive to film plane variations. With the projector lens system of FIG. 7, which is represented in the other figures by numeral 45, the back focus in increased to about 4", which is to say that the entrance pupil of the lens system is that far from the film plane. The effect on the screen, of film plane instabilities, is drastically reduced. This is a profound relief to the viewer and is a prime factor in making the system a successful one.

It is evident that the image surface produced by a practical lens of this type will, generally speaking, be essentially spherical. It is also obvious that the projector will be located farther from the screen than the radius of curvature of the screen in normal installations. It is essential that the screen and the image field essentially coincide, and that the image be the correct size. This is determined in the instant invention by an interrelationship between screen curvature and magnification. The projector system comprising a prime lens and a retrofocus attachment (sometimes called a "magnifier" or "magnifying attachment") provides essentially a spherical image field. The image field 70 (which has some practical depth) and the screen will coincide in some plane, such as the horizontal plane through the screen in FIG. 6, although this coincidence may be elsewhere than at the center of the screen. The curvature of the field is adjusted by the magnifier so that the entire image region fits within the field. At the same time, this magnifying lens system overcomes the disadvantages of film instability as aforesaid.

In the instant invention, it has been found suitable to utilize backup or prime lenses 71 such as a Kollmorgen BX 265, and then to add to this lens a magnifying attachment 72 whose properties are such as to provide a mean magnification on the order of preferably about 1.75, variable from about 1.5 to 2, and then a fine adjustment is made to provide the best focus by adjusting the magnification. The magnifier will ordinarily include a positive and a negative doublet 73, 74, the positive being closer to the prime lens. The negative doublet is mounted for adjustable axial motion relative to the prime lens and positive doublet forward or backward so as to cause the magnification and field curvature to change until the best coincidence of image field and screen surface is obtained. In making any specific installation, some experimentation must be made to select an appropriate focal length for the prime lens, and then a compatible magnifier can be used finely to adjust magnification on image field curvature. A respective projection lens and magnifier assembly is customarily used for each film process, and the system adjusted for optimum results for each. Once the lens system is set, then no further adjustments are needed. Projection systems are merely exchanged between features when they relate to different aspect ratios.

The projection system is therefore adjusted by selecting the appropriate backup lens which, for example, might be selected from a group consisting of 5¾", 6" and 6¼" focal length lenses, and the making of the adjustment with the magnifier heretofore described. For example, in one theatre having a ratio of screen depth to projector throw of 16:103, a Kollmorgen BX 265 lens with a focal length of 6¼" was used with a 2× magnifier in combination with a screen having a curvature of 120° of arc, and the negative doublet position was adjusted for optimum visual effect. There results from the projection system of FIGS. 5–7 a stable image much less sensitive to film instability than in any process known in the prior art and which substantially coincides with the curved screen at a desired magnification. In many respects the resulting image is quite suitable without additional provisions for illusion. However, the illusion can be heightened by certain masking techniques and structures. FIGS. 9A–12F relate to the use of masking for illusion.

FIGS. 9A–9C relate to a screen which is rectangular in plan view. FIGS. 9D–9F relate to a screen in which the image region is rectangular in plan view.

FIGS. 10A–10C relate to a screen whose edges are defined by contoured masking. FIGS. 10D–10F show the masking itself around the same areas.

FIGS. 11A–11F are representations of what an observer looking up 6° (θ in FIG. 8) would see. FIGS. 12A–12F are representations of what an observed looking down 6° (θ in FIG. 8) would see.

FIGS. 9B, 10B, 11B and 12B show the incidence on the screen of certain angles, viewed sidewise on the horizontal projector axis 46. The dashed lines show the projector rays. The dotted lines show the perceived rays to the observer.

FIGS. 9A–9C show the general image scheme on an unmasked rectangular screen as viewed from the projector lens.

FIGS. 9C, 10C, 11C, and 12C show the image and structure of respective FIGS. 9A, 10A, 11A, and 12A laid flat.

The series of D, E, and F figures correlate with the series of A, B and C figures in series 9–12, and illustrates the use of the masking. Upper and lower screen edges 60, 61 will appear to diverge from each other as they extend away from the center, while right and left-hand edges 62, 63 will remain essentially vertical. Horizons 64, 65 projected on the screen will appear as straight lines to the projector. It will be noted that in the four corners there are areas 66, which do not contain any information even though the upper and lower edges are, in fact, horizontal. This is, of course, due to the difference in location of the projector lens from the center of the screen. Were the screen laid out flat in plan view, and the lines and edges carried with them, the result is that shown in FIG. 9C which shows that the horizons, instead of being straight lines are, in fact curved lines with a barreled relationship.

FIGS. 10A–10C indicate how this effect can be minimized by contouring the screen such as by masking. The example shown involves making the right and left-hand edges shorter than the height of the center of the screen. Then a slightly barreled screen as shown in FIG. 10C results, but with lesser areas 69 at the four corners. The result to a viewer would be the closer correspondence of lines which the viewer would believe to be a true horizon, that is the upper and lower edges of the screen. This does not mean that the upper and lower edges of the image region need to be horizontal and, in fact, were the screen edge contoured or masked as shown in FIGS. 10A–10C, the edges would be neither horizontal nor straight.

FIGS. 11A–11C and 12A–12C relate to a viewer whose angle θ is up 6° and to one whose angle θ is 6° down, respectively. Here it will be seen that a line which is projected as a true horizon by the projector (horizons 64 and 65) will be curved as seen by the viewer in opposite directions for up and down, and that the upper and lower curvatures of the scalloped screen of FIG. 10 will also be different. The same minimization of areas 69 and nearer convergence of edges and lines intended to be seen as horizontal will be evident.

Now consider the masking technique heretofore described. The contrast between FIGS. 9 and FIGS. 10–12 is evident in FIGS. 9D–9F where an unscalloped masking is used. The same divergence between the horizons and, in the case, the edge 80 of an upper mask will be evident and this is also true in the plan view. In FIGS. 10D–10F, the masking has been scalloped top and bottom. It will be seen that essentially the same interrelationship between horizon and screen edge occurs as shown in FIG. 10A, except that the side masking may be brought in, the better to minimize the size of areas 69. Also, if desired, some of the upper part of the screen can be masked, thereby eliminating some of the region of greatest distortion. The favorable effect on this arrangement as to the viewers with an up and down relationship may readily be determined from a study of FIGS. 11D–11F and 12D–12F where it will be seen that there is an interestingly close correlation between the shape of the curves seen by these observers and that which is actually viewed by the projector, and the shape of the masking. The dashed lines are the projector lines. The dotted lines are the intersection at the screen of a plane passing through the observer's eyes. The scale used herein prevents a truly accurate showing of these interrelationships, but the scheme is as illustrated. There therefore results from this masking a closer relationship between what the viewer would expect to see and what he does, in fact, see, and it is so effective that a viewer will reject a subject which is intended to be horizontal as being anything but horizontal when this masking is used. A similar result is evident as to curves and shapes.

The maskings are adjustable to provide the appropriate aspect ratio and to select appropriate areas of the screen for the image region. When upper and lower masks are used, even the elevation of the region can be varied. As to the amount of scalloping of the maskings, the following considerations are effective for the projection systems as indicated, and this may be extrapolated to other optical screen sizes and shapes. The table relates to a 120° arcuate screen. Should a larger arc be utilized, then the arcs will simply be continued on approximately the curvatures indicated by the table. The table shows the deviation between top and bottom elevations of the masking edges at 60° each side of the center, and at the center. The upper edge is domed upwardly, and the lower one sags. While edge and center dimensions only are given, it will be recognized that a smooth arc may be drawn through these points, and this is the approximate shape which is desired. There follows herewith a table of values from which the design of any particular theatre installation may be determined.

| | Effective Focal Length of Entire Projection Lens System | | | | | | | |
|---|---|---|---|---|---|---|---|---|
| Angle of Principal Projection Axis to Screen Center [1] | 49 mm. or less Masking Deviation | | 50–74 mm. Masking | | 75–99 mm. Masking | | 100 mm. or more Masking | |
| | Top, percent | Bottom, percent | Top, percent | Bottom, percent | Top, percent | Bottom, percent | Top, percent | Bottom percent |
| +6° | 10 | 4 | 7½ | 3 | 5 | 2 | 2½ | 1 |
| +5° | 9½ | 4½ | 7⅛ | 3¾ | 4¾ | 2¼ | 2⅜ | 1⅛ |
| +4° | 9 | 5 | 6¾ | 3¾ | 4½ | 2½ | 2¼ | 1¼ |
| +3° | 8½ | 5½ | 6⅜ | 4⅛ | 4¼ | 2¾ | 2⅛ | 1⅜ |
| +2° | 8 | 6 | 6 | 4½ | 4 | 3 | 2 | 1½ |
| +1° | 7½ | 6½ | 5⅝ | 4⅞ | 3¾ | 3¼ | 1⅞ | 1⅝ |
| 0° | 7 | 7 | 5¼ | 5¼ | 3½ | 3½ | 1¾ | 1¾ |
| −1° | 6½ | 7½ | 4⅞ | 5⅝ | 3¼ | 3¾ | 1⅝ | 1⅞ |
| −2° | 6 | 8 | 4½ | 6 | 3 | 4 | 1½ | 2 |
| −3° | 5½ | 8½ | 4⅛ | 6⅜ | 2¾ | 4¼ | 1⅜ | 2⅛ |
| −4° | 5 | 9 | 3¾ | 6¾ | 2½ | 4½ | 1¼ | 2¼ |
| −5° | 4½ | 9½ | 3⅜ | 7⅛ | 2¼ | 4¾ | 1⅛ | 2⅜ |
| −6° | 4 | 10 | 3 | 7½ | 2 | 5 | 1 | 2½ |

[1] Predicated on 2:1 screen aspect ratio.
+ = Upward vertical angle.
− = Downward vertical angle.

The above values may also be extrapolated to different angles of incidence, using the criteria given above to determine how the contour of the mask is to vary. Importantly, the values shown in the table above provide a useful effect for all common aspect ratio image region sizes.

There is therefore shown and described herein a photographic system suitable for deriving images to be shown on deeply curved screens, together with a projection lens technique which enables a good image to be formed to the curvature of the screen, with less sensitivity to film instability than in prior art processes. There also is shown herewith a masking technique which is movable to accommodate different aspect ratios in an auditorium whereby to accommodate any known process even for flat screens, together with appropriate masking shapes to enhance the illusion of a well-ordered field in deeply curved screen projection.

When all of these features are used together with a deeply curved screen, the result is far greater than the sum of their parts, the illusion being complete and far in excess of industry standards for clarity, resolution, and the like.

I claim:

1. In combination: a deeply curved screen sheet having a concave image region intended to face toward an audience, said image region being a surface generated by a straight-line generator which is generally upright relative to a projection axis directed toward said region, the directrix of the generator being a curve lying in a lateral plane normal to the geneator; and a masking system for the image region comprising a first and a second mask, each having an edge extending generally parallel to the generator, and a third mask having an edge extending between and intersecting with the edges of the members of the first and second masks, thereby to frame the image region at three of its sides, the edge of the said third mask being generally horizontally-oriented and forming intersections with the edges of the first and second masks and having a mid-point midway between said intersections, the elevation of said two intersections being closer to the mid-elevation of the image region than is the elevation of the said mid-point, the two intersections and the said mid-point being connected by a generally continuous curve which is concave toward said mid-elevation, all of the said edges conforming to the contour of the screen sheet, and the masks extending away from their respective edges and the image region so as to leave the image region unobstructed and to mask off from view those parts of the screen sheet which are contiguous to the image region.

2. A combination according to claim 1 in which the edges of the masks are movable in order to change the aspect ratio of the image region, the first and second mask edges being laterally movable and the third mask edge being vertically movable.

3. A combination according to claim 1 in which a fourth generally horizontal mask is provided which also has an edge extending between its intersections with the edges of the first and second masks, whereby one of said third and fourth masks forms the top boundary and the other forms the bottom boundary of the image region.

4. A combination according to claim 3 in which the edges of the masks are movable in order to change the aspect ratio of the image region, the first and second mask edges being laterally movable and at least one of the third and fourth mask edges being vertically movable.

5. A combination according to claim 4 in which both of the third and fourth mask edges are vertically movable.

6. A combination according to claim 3 in which the edge of the fourth mask has a mid-point between its intersections with the first and second masks whose elevation is farther from that of the mid-elevation of the image region than is the elevation of the intersections of this edge with the edges of the first and second masks, these last-named intersections and the respective mid-point being connected by a generally continuous curve which is concave toward said mid-elevation.

7. In combination: a projector having a projection axis, light source, and a film plane; a deeply curved screen sheet having a concave image region facing toward the projector and intersected by the projection axis, the image region being a surface generated by a straight-line generator which is generally upright relative to the projection axis, the directrix of the generator being a curve lying in a lateral plane normal to the generator; and a projector lens assembly between the film plane and the screen, the projector lens assembly comprising a prime lens, a positive doublet, and a negative doublet in that order from the film plane, the two doublets together constituting a magnifying lens system, the negative doublet being independently axially movable along the projection axis relative to the prime lens and to the positive doublet for adjustably conforming the projected image to the image region, and also constituting retrofocus means for minimizing on the image region the effects of film instability in the film plane.

8. In combination: a deeply curved screen sheet having a concave image region intended to face toward an audience, said image region being a surface generated by a straight-line generator which is generally upright relative to a projection axis directed toward said region, the directrix of the generator being a curve lying in a lateral plane normal to the generator; a masking system for the image region comprising a first and a second mask, each having an edge extending generally parallel to the generator, and a third mask having an edge extending between and intersecting with the edges of the members of the first and second masks, thereby to frame the image region at three of its sides, the edge of the said third mask being generally horizontally-oriented and forming intersections with the edges of the first and second masks and having a mid-point midway between said intersections, the elevation of said two intersections being closer to the mid-elevation of the image region than is the elevation of the said mid-point, the two intersections and the said mid-point being connected by a generally continuous curve which is concave toward said mid-elevation, all of the said edges conforming to the contour of the screen sheet, and the masks extending away from their respective edges and the image region so as to leave the image region unobstructed and to mask off from view those parts of the screen sheet which are contiguous to the image region; a projector having said projection axis, a light source, a film plane, and a projector lens assembly between the film plane and the screen sheet, the projector lens assembly comprising a prime lens, a positive doublet, and a negative doublet along said projection axis in that order from the film plane, the two doublets together constituting a magnifying lens system, the negative doublet being independently axially movable along the projection axis relative to the prime lens and to the positive doublet for adjustably conforming the projected image to the image region, and also constituting retrofocus means for minimizing on the image region the effects of film instability in the film plane.

9. A combination according to claim 8 in which the edges of the masks are movable in order to change the aspect ratio of the image region, the first and second mask edges being laterally movable and the third mask edge being vertically movable.

10. A combination according to claim 8 in which a fourth generally horizontal mask is provided which also has an edge extending between its intersections with the edges of the first and second masks, whereby one of said third and fourth masks forms the top boundary and the other forms the bottom boundary of the image region.

11. A combination according to claim 10 in which the edges of the masks are movable in order to change the aspect ratio of the image region, the first and second mask edges being laterally movable and at least one of the third and fourth mask edges being vertically movable.

12. A combination according to claim 11 in which both of the third and fourth mask edges are vertically movable.

13. A combination according to claim 10 in which the edge of the fourth mask has a mid-point between its intersections with the first and second masks whose elevation is farther from that of the mid-elevation of the image region than is the elevation of the intersections of this edge with the edges of the first and second masks, these last-named intersections and the respective mid-point being connected by a generally continuous curve which is concave toward said mid-elevation.

References Cited

UNITED STATES PATENTS

| | | | |
|---|---|---|---|
| 1,395,513 | 11/1921 | Owen | 350—124 |
| 1,591,296 | 7/1926 | Douglass. | |
| 1,882,828 | 10/1932 | Hall et al. | 350—124 |
| 2,280,608 | 4/1942 | Tornquist | 352—142 |
| 2,737,081 | 3/1956 | Dowling. | |
| 2,857,805 | 10/1958 | O'Brien. | |
| 2,940,372 | 6/1960 | Ehrenhaft et al. | |
| 3,016,790 | 1/1962 | Nakamatsu | 352—69 |
| 3,292,491 | 12/1966 | Hourdiaux. | |

FOREIGN PATENTS

| | | |
|---|---|---|
| 894,527 | 3/1944 | France. |
| 1,313,268 | 11/1962 | France. |

JULIA E. COINER, Primary Examiner

U.S. Cl. X.R.

350—124, 125, 212; 352—79

PO-1050
(5/69)

UNITED STATES PATENT OFFICE
CERTIFICATE OF CORRECTION

Patent No. __3,475,086__ Dated __October 28, 1969__

Inventor(s) __Richard H. Vetter__

It is certified that error appears in the above-identified patent and that said Letters Patent are hereby corrected as shown below:

Column 5, line 12 "masks" should be "mask"

Column 5, line 32 "poistions" should be "positions"

Column 7, line 47 "θ" second occurance should be "∅"

Column 9, line 71 before "light" insert "a"

SIGNED AND
SEALED
AUG 25 1970

(SEAL)
Attest:

Edward M. Fletcher, Jr.
Attesting Officer

WILLIAM E. SCHUYLER, JR.
Commissioner of Patents